(No Model.) 2 Sheets—Sheet 2.
W. R. BEAL.
GAS SCRUBBER.
No. 510,396. Patented Dec. 12, 1893.
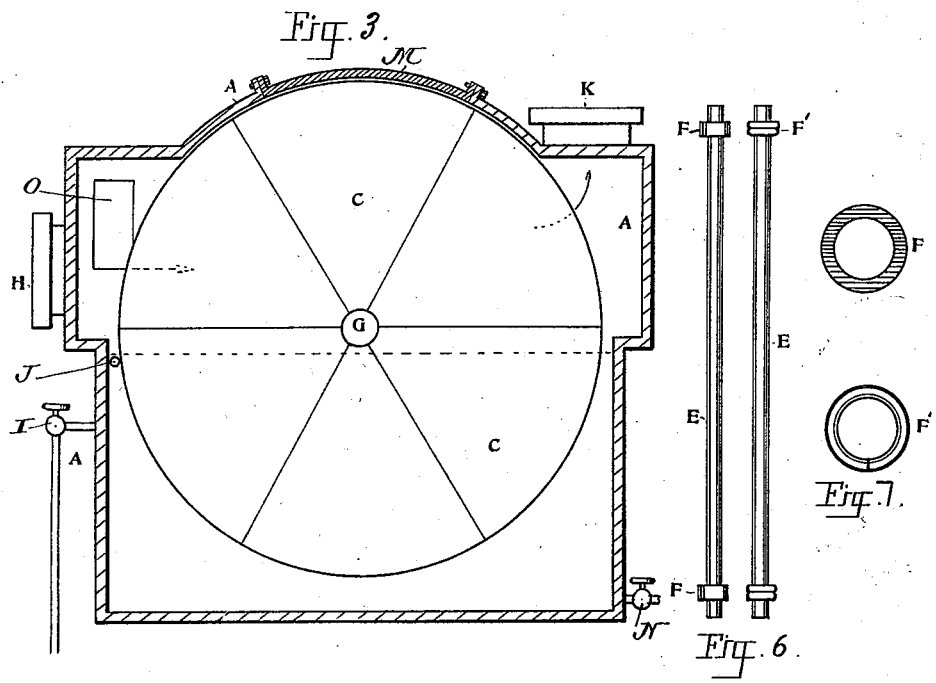
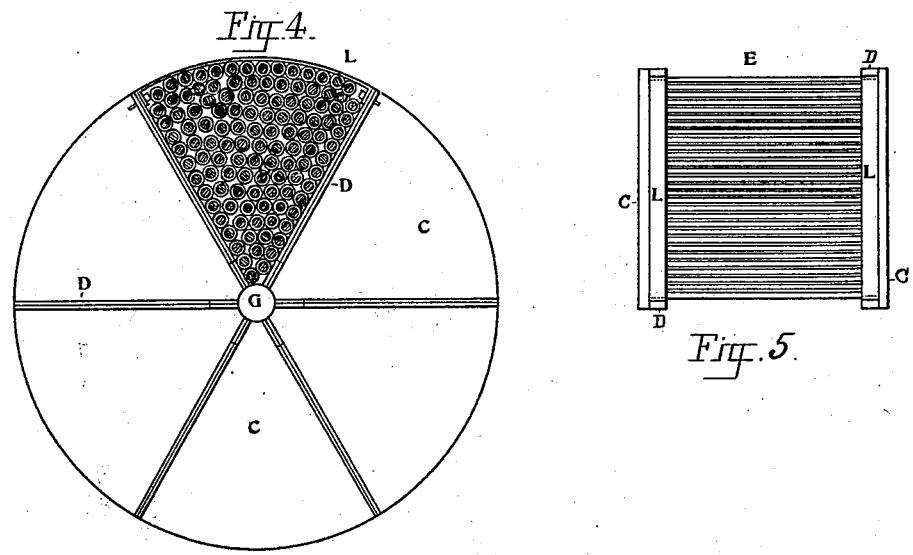
WITNESSES:
INVENTOR
William R. Beal
BY A. Bell
ATTORNEY.

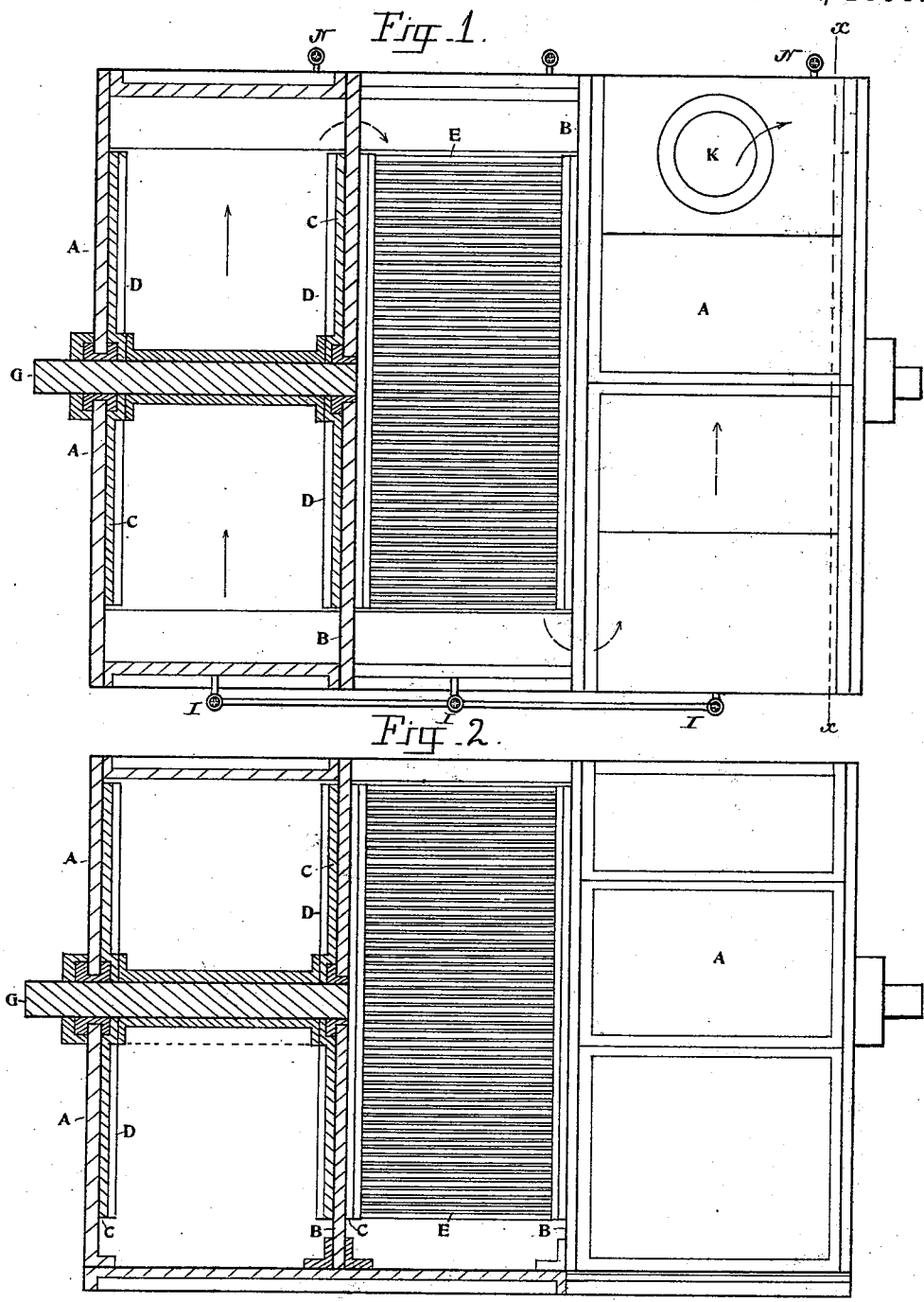

UNITED STATES PATENT OFFICE.

WILLIAM R. BEAL, OF NEW YORK, N. Y., ASSIGNOR TO JAMES R. FLOYD & SONS, OF SAME PLACE.

GAS-SCRUBBER.

SPECIFICATION forming part of Letters Patent No. 510,396, dated December 12, 1893.

Application filed March 6, 1893. Serial No. 464,771. (No model.)

*To all whom it may concern:*

Be it known that I, WILLIAM R. BEAL, a citizen of the United States, and a resident of the city, county, and State of New York, have invented certain new and useful Improvements in Gas-Scrubbers, of which the following is a specification.

My invention relates to the washing or scrubbing of gas, and has special reference to the means employed in a rotary scrubber to secure the maximum of wetted surfaces within said scrubber and their easy removal for cleansing purposes.

While the primary object of a gas scrubber is the elimination of the ammoniacal properties in crude gas, it is well known that certain tarry elements are also deposited during this process of purification and that their presence requires frequent cleansing of the scrubber to prevent its clogging from this cause. It is therefore highly essential in the construction of a gas scrubber, that, in providing for extensive wetted surfaces against which the gas is brought into frictional contact in its passage through the apparatus, provision should also be made for the prompt removal, through cleansing and expeditious replacement of said surfaces when any excess of tar is found deposited thereon. Besides accomplishing these desiderata in a most effectual manner, I do so by an exceedingly simple device which consists in providing each compartment of the apparatus with two circular plates mounted upon a common shaft, the plates having radial flanges forming segmental divisions thereon. I fill these divisions with rods transversely and loosely laid between the circular plates, the rods being separated from each other by rings fitting over the rods at each end thereof, thus affording ample space between them for the passage of gas. When in service, these plates and rods are continually wetted by the rotary movement of the plates through water in the lower part of the compartment. As the compartments open into each other above the water line the gas traverses the entire series, through the rotary plates and rods therein. By having one of the plates of the main shell, in each compartment, removable, the rods can be easily taken out and replaced by others.

In the accompanying drawings: Figure 1, represents a plan view of a scrubber, partly in section, provided with my invention. Fig. 2, is a side elevation, partly in section. Fig. 3, is a sectional end elevation, taken on line $x$—$x$ Fig. 1. Fig. 4, represents one of the circular plates divided into segmental divisions by the radial flanges thereon, with the rods in position in one of said divisions. Fig. 5, is a plan view of one of the segmental divisions and the rods held in position therein. Fig. 6, is a perspective view of the rods showing the collars thereon. Fig. 7, represents two forms of collars which may be fitted on the rods.

In the drawings like letters refer to like parts.

A is the outer shell of the main chamber of the scrubber, and B B the partitions forming the compartments therein.

C C are the circular plates, mounted upon shaft G.

D D are the radial flanges which form segmental divisions on said plates. The rods E, having collars F thereon, are loosely laid between the circular plates, until each of the segmental divisions is filled with the rods. The rods are held in place by strips or bands L, shown in Figs. 4 and 5, said bands being secured at their ends by bolts through the flanges D. The rings, or collars F, are preferably of cast metal, but may be made of any suitable material, the ring F', shown in Figs. 6 and 7, being of heavy wire formed in one or more coils. Disks of wood, paper, or metal, may also be secured to the ends of the rods—in lieu of the rings shown—the object of these being to keep the rods sufficiently separated from each other so as to allow a free passage for the gas passing through the scrubber.

The partitions B, which form the compartments, reach from the base to the top of the scrubber, the lower part of each compartment below the dotted lines shown in Figs. 2 and 3 being filled with water through supply pipes I, the water being admitted into the last compartment of the series, and by overflow passages J fed to the other compartments, the first compartment being understood as the one into which the gas first enters, through pipe H.

N are discharge pipes for the water. Above the shaft G, the partitions are provided with openings O (Fig. 3) with area equal, at least, to the inlet pipe H. These openings are so arranged at the opposite ends of each compartment that a serpentine movement, indicated by the arrows in Fig. 1, is imparted to the gas on its passage through the scrubber to the discharge pipe K.

To provide for the cleaning of the scrubber at any time when the rods become covered with an excess of tar, a plate M (Fig. 3) in the shell of the main chamber, above the shaft on each compartment, may be made removable. Through this the rods can be readily taken out and immediately replaced by clean ones.

What I claim as new and of my own invention, and for which I ask Letters Patent of the United States, is—

A washer for gas scrubbing apparatus comprising a shaft G having two plates or disks C C secured transversely and separated thereon, ribs or flanges D on said plates, the flanges on each plate similarly arranged so as to form pockets or receptacles for rods E, the said rods constructed to fit laterally removable between the plates and within the flanges and having separate or individual collars F, and the removable strip or band L for holding the rods in the pockets, substantially as shown and described.

In testimony that I claim the foregoing as my invention I have signed my name, in presence of two witnesses, this 28th day of February, 1893.

WM. R. BEAL.

Witnesses:
 AMOS HADLEY,
 J. W. DENE.